United States Patent [19]
Gustafson

[11] 3,857,780
[45] Dec. 31, 1974

[54] HYDROFORMING PETROLEUM FRACTIONS IN GAS PHASE USING SHAPED CATALYST PARTICLES

[76] Inventor: William Roy Gustafson, 124 Horse Tavern Rd., Trumbull, Conn. 06611

[22] Filed: Aug. 3, 1973

[21] Appl. No.: 385,518

Related U.S. Application Data

[63] Continuation-in-part of Ser. No. 255,491, May 22, 1972, abandoned.

[52] U.S. Cl.............. 208/139, 208/135, 252/477 R, 208/138
[51] Int. Cl............................................. C10g 35/08
[58] Field of Search .......... 208/139, 138, 133, 134; 252/477

[56] References Cited
UNITED STATES PATENTS

| | | | |
|---|---|---|---|
| 3,511,773 | 5/1970 | Addison et al...................... | 208/138 |
| 3,558,477 | 1/1971 | Kluksdahl........................... | 208/138 |
| 3,674,680 | 4/1972 | Hoekstra et al. .................... | 208/216 |

Primary Examiner—Delbert E. Gantz
Assistant Examiner—G. J. Crasanakis
Attorney, Agent, or Firm—William J. Van Loo

[57] ABSTRACT

An improvement in the process of hydroforming petroleum fractions wherein a petroleum fraction is contacted in gaseous phase and in the presence of hydrogen with catalyst particles comprised of a formed porous alumina base carrying a promoter selected from platinum and mixtures of platinum and rhenium, gallium, germanium, iridium, rhodium, and zinc, said improvement comprising use of catalyst particles which are of polylobal cross-sectional shape.

7 Claims, 12 Drawing Figures

3,857,780

HYDROFORMING PETROLEUM FRACTIONS IN GAS PHASE USING SHAPED CATALYST PARTICLES

This application is a continuation-in-part of Ser. No. 255,491, filed May 22, 1972 now abandoned.

This invention relates to an improved process for hydroforming petroleum fractions in the gaseous phase. More particularly, this invention relates to hydroforming petroleum fractions in gaseous phase in the presence of hydrogen by contacting said gaseous phase with a catalyst having a special cross-sectional shape.

In U.S. Pat. No. 3,674,680 issued July 4, 1972 to Hockstra, et al., it is demonstrated that formed catalyst particles of small size particular shape, and large pores can have an effect on catalyst life in trickle bed hydrotreating. In trickle bed hydrotreating, the petroleum fraction is in the liquid phase.

In the catalytic reactions described above where diffusion plays a role, it is known that catalyst activity increases with decreasing particle size. However, as particle size decreases, pressure drop normally builds up to intolerable levels. By use of special cross-sectional shapes in the formed catalysts, pressure drops can be reduced for smaller particles providing increased activity.

In processing petroleum fractions in liquid phase, it can also be demonstrated that certain cross-sectional shapes improve activity over that attributable to the reduced particle size, but that not all shapes provide the improved activity. The effective cross-sectional shapes are generally of polylobal nature and provide troughs between lobes on the outer catalyst surface, which troughs appear to act as oil flow distributors, enhancing contacting efficiency and diffusion into active catalyst sites.

In gas phase reactions, where diffusion also appears to play a role, particle size would also appear to have an effect on activity in much the same way as in liquid phase reactions. Again, reduced particle sizes would provide increased catalyst activity, but pressure drops would normally increase with decreased particle size. By use of special cross-sectional shapes in the formed catalysts, pressure drops apparently could be reduced for smaller particles.

In gas phase reactions, however where there are no liquid reactants present, there can be no trough effect as decribed above, and, therefore, no advantage in catalyst activity attributable thereto.

The effect of diffusion in catalytic reactions wherein it plays a role is to cause increased catalyst activity with decreased particle size. The significant factor with respect to diffusion reactions if the ratio of geometric particle volume to geometric particle surface. This ratio decreases as particle size decreases. A plot of activity against the ratio of geometric particle volume to geometric particle surface forms a straight line with increasing activity resulting from decreased ratio. Accordingly, the effect of particle size on activity is readily ascertainable from such a plot and, while special shapes can reduce pressure drops for certain small particles, the activity actually obtained must be considered in light of the activity-ratio curve discussed.

In considering catalyst materials for gas phase reactions, interest has been concentrated on finding novel catalyst compositions that provide improvements in activity at conventional particle sizes, i.e., those which produce tolerable pressure drops. Much success has been achieved in providing improved catalyst compositions and the success has aroused even greater interest in novel catalyst compositions at the expense of interest in other areas of research.

A gas phase reaction that has received considerable attention is that of oxidation of exhaust gases emanating from internal combustion engines. Considerable success has been achieved in providing improved catalyst compositions for this reaction. In addition to catalyst compositions providing improved oxidation activity there have been provided catalyst compositions resistant to poisoning by lead compounds, by sulfur compounds, or by both. In addition, there have been provided catalyst compositions that are effective at low bed temperatures, remain active at high operating temperatures, are resistant to thermal shrinkage, and have other desirable properties.

Studies have been carried out to determine the effect of cross-sectional particle shape on catalyst compositions useful in oxidizing exhaust gases from internal combustion engines. It was found that pressure drops could be reduced by use of particles of special cross-sectional shape and that use of particles of such shape allowed use of smaller particles while maintaining a tolerable pressure drop. Although an increase in catalyst activity was obtained as a result of the use of smaller catalyst particles, such increase was exactly that predicted from the plot of activity against ratio of geometric particle volume to geometric particle surface. Thus, no unexpected advantages arose from use of catalyst particles of special cross-sectional shape.

Although certain cross-sectional shape characteristics of catalyst particles can have a beneficial effect on pressure drop while providing the expected activity associated with particle size with respect to gas phase reactions, other cross-sectional shapes can have an adverse effect on activity associated with particle size. Catalyst particles in tubular shape, i.e., hollow cylinders, are effective in reducing pressure drop but have an adverse effect on catalyst activity. Such loss in activity is believed to be associated with particle orientation in the catalyst bed. Since a random orientation of particles would be expected in normal bed loading, it would mean that the hollow in the tubular shaped particles would be opposed to the direction of gas flow as often as it would be parallel therewith. Since effective catalyst surface and its promoter content would be associated with the hollow of the tubular catalyst particles, those particles oriented in opposition to the direction of gas flow would only present a portion of their catalytic surface to the reactant gases and full activity of all particles would not be achieved. Thus, tubular shaped catalyst particles, as well as other shaped catalyst particles, more than offset any advantage in pressure drop by the disadvantage in activity achieved.

In accordance with the present invention, there is provided an improvement in a process of hydroforming a petroleum fraction wherein said petroleum fraction is contacted in gaseous phase and in the presence of hydrogen with catalyst particles comprised a formed porous alumina base carrying a promoter selected from platinum, rhenium, and mixtures thereof, the improvement which comprises using catalyst particles which are of polylobal cross-sectional shape, said polylobal cross-sectional shape being such that the lobes are defined by circles of equal diameter, the centers of which circles are spaced from one another by a distance which is from about ⅝ to 15/16 the diameter of a circle and when more than two lobes are present lines connecting the centers of adjacent circles form a substantially unilateral polygon each side of which is from about ⅝ to 15/16 the diameter of a circle and all area included by circles and polygon is of said porous alumina base.

In the accompanying drawings, FIG. 5 is a cross-sectional view of a trilobal catalyst particle of the present invention.

Figure 1:
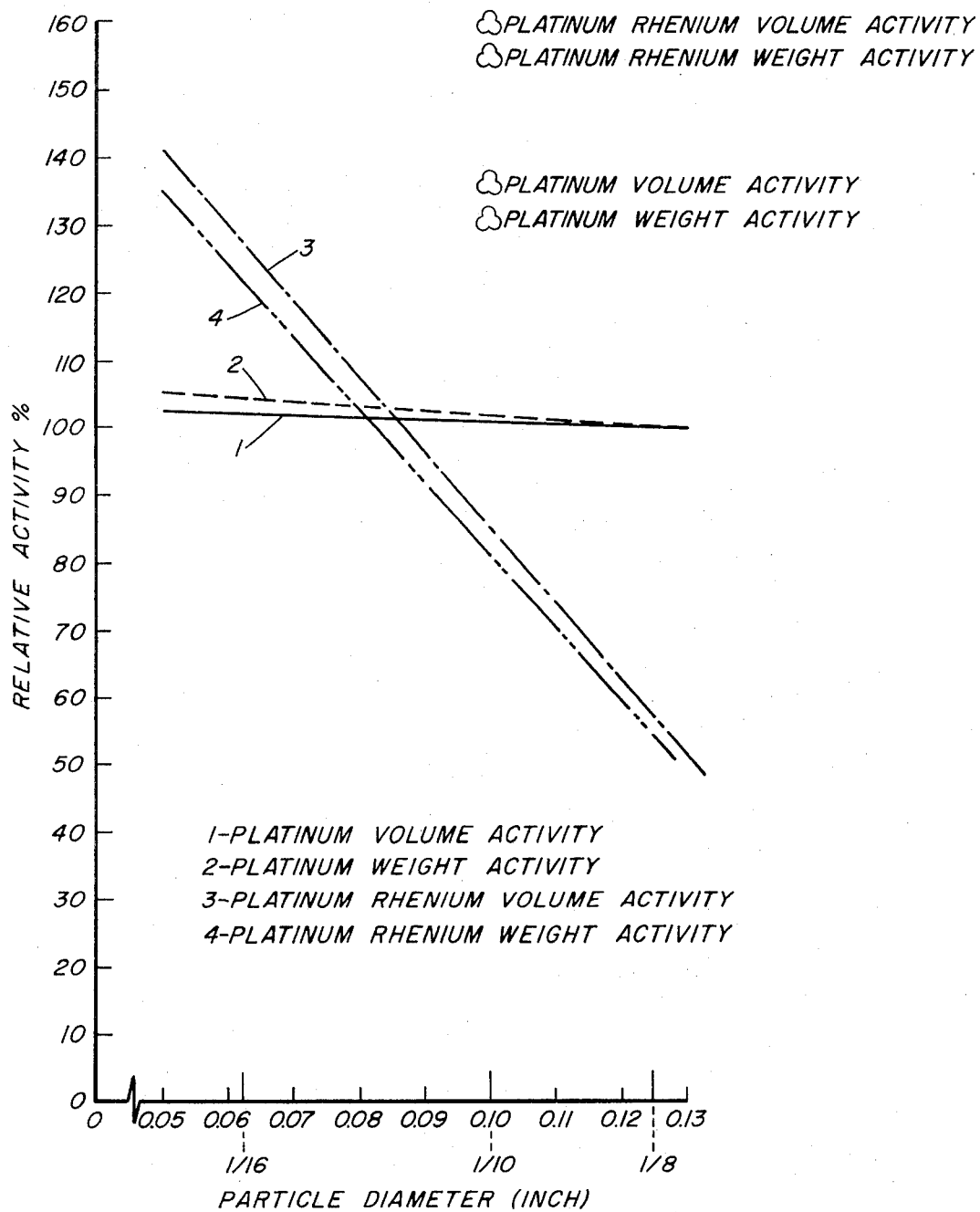
FIG. 1 is a plot of catalyst activity against particle size of catalyst materials.

In carrying out the process of the present invention, the conventional procedure for hydrotreating the petroleum fraction is followed except for the specific catalyst particles employed. In the process of the present invention, the conventional catalyst particles are replaced by catalyst particles which have the specified polylobal shape and have the conventional promoter composition. Thus, the essential different of the present process over the conventional process is in the cross-sectional shape of the catalyst particles employed.

The present process provides greatly improved efficiency in the hydroforming reaction over that of the conventional process. This result is highly unexpected in view of the facts that gas phase reactions would not appear to be affected by catalyst particle shape, that other gas phase reactions are not affected by catalyst particle shape, and that not all catalyst particle shapes result in improved reaction efficiency.

The catalyst base or carrier from which the catalyst materials are prepared is composed of a major portion of alumina. In addition, there may be present up to about 20 weight percent of another inorganic hydrous oxide typically empolyed in preparing an alumina base, such as silica, the percentage being based on the total weight of the base. If silica per se is to be incorporated in the catalyst base, it is generally used in amounts up to about 5 weight percent, based on the weight of silica-alumina. If an aluminosilicate, i.e., a zeolite, is to be incorporated in the catalyst base, it may be used in amounts up to about 25 weight percent, based on the total weight of alumina-zeolite. In view of the silica content of zeolites, such incorporation thereof will provide up to about 20 weight percent of silica based on the total weight of alumina-silica in the base.

The alumina is preferably prepared by precipitation, such as by adding sodium aluminate to an aqueous solution of aluminum sulfate. The precipitate is washed free of salts and then dried to form a powder, preferably by spray-drying.

The powder is then mix-mulled to provide an extrusion paste which is then extruded through orifices of polylobal cross-sectional shape, cut to desired length, dried and calcined.

Provision for silica content may be by strike incorporation, by use of a silica heel in carrying out the alumina strike, or by incorporation during mix-mulling. Such methods of incorporation are conventional and require no new techniques.

Promoter incorporation also follows conventional techniques. Promoters may be incorporated in conjunction with mix-mulling or in conjunction with alumina processing prior to drying, but it is generally preferred to impregnate the calcined extrudate with suitable compounds that will yield the desired promoter contents. Promoter materials preferred for hydroforming are platinum, and mixtures thereof with rhenium, gallium, germanium, iriduim, rhodium and zinc. The promoter metal or metals will generally be present in an amount totaling from about 0.1 to 1.0 weight percent, based on the total weight of the promoted extrudate. In addition an amount of chloride ion equal to that of the total metal content will preferably be present. Sulfur may also be used as a promoter additive. The promoter metals, in ion form in aqueous hydrochloric acid solution, are impregnated onto the alumina base in the amount desired following conventional procedures. The impregnated base is then activated to render the promoters in metal form. Activation is by conventional drying and calcining, although a separate drying step is not essential.

Figure 4:
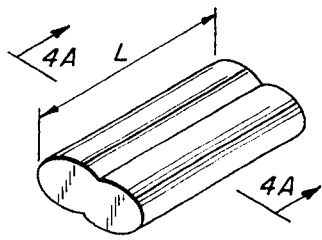
FIGS. 4 and 6 are cross-sectional views of additional polylobal catalyst particles of the present invention, illustrating dilobal and tetralobal shapes, respectively.
Figure 4A:
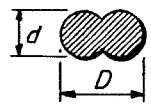
Figure 5:
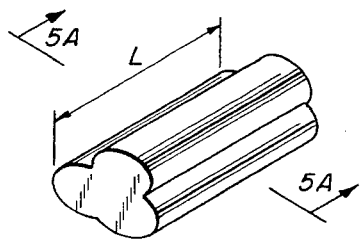
Figure 5A:
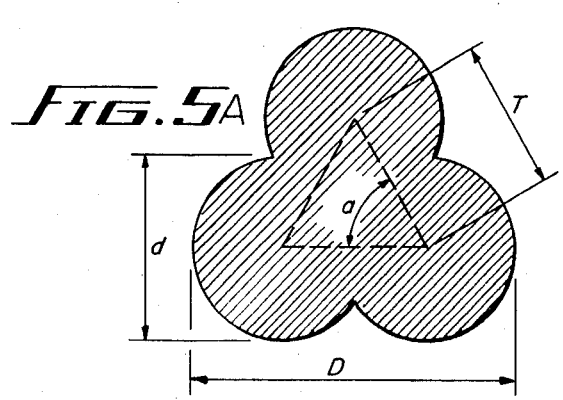
Figure 6:
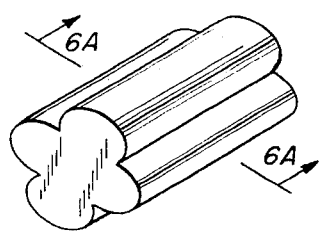
Figure 6A:
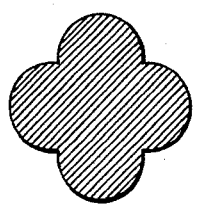

As previously indicated, the novel aspect of the present gas phase catalystic process is the use of catalyst particles of polylobal cross-sectional shape. Such shape arises when two or more rounded or curved projections emanate from a central body structure. Typical shapes are shown in FIGS. 5, 4 and 6, wherein three, two and four lobes, respectively, are shown. The lobes are of equal size and at least two must be present. The number of lobes preferably is three but more can be present. Increasing the number of lobes to about about 5 tends to increase difficulties of maintaining the shape in conjunction with extrusion and can cause loss of the lobal character necessary. Provision of large numbers of lobes is unnecessary and, accordingly, not preferred. Generally, the number of lobes will be in the range of 2 to 5. In addition to the specified number of lobes of equal diameter, it is also necessary that the arrangement of lobes in the cross-sectional shape be in a specific manner. The centers of the circles of equal diameter which define the lobes must be spaced from one another by a distance which is from about ⅝ to 15/16 the diameter of a circle and when more than two lobes are present lines connecting the centers of adjacent circles must form a substantially equilateral polygon, each side of which is from about ⅝ to 15/16 the diameter of a circle and all area included by the circles and equilateral polygon must be of said porous alumina base.

Hydroforming, as that term is employed herein, is a conventional term and means reforming a petroleum fraction in gas phase in the presence of hydrogen at an elevated temperature and pressure to a stock of higher octane number. The process, because of its nature, includes molecular rearrangements of feed-stock components as well as molecule splitting. The following reactions also will occur to a greater or lesser extent:

1. Naphthenes will lose hydrogen to become the corresponding aromatics, which are higher in octane number;
2. Straight-chain paraffins will rearrange into branched-chain paraffins which are higher in octane number;
3. Heavy paraffins of low octane number will be hydrocracked to lighter paraffins of higher octane number;
4. Heavy paraffins will lose hydrogen and form rings to become aromatics of high octane number; and
5. Hydrogen gas present in the reaction will react with sulfur-containing impurities to form easily removable hydrogen sulfide gas.

Accordingly, specific terms such as "reforming," "isomerization," and "desulfurization" do not properly apply to the total processing potential and use of the term "hydroforming" is necessary to be properly descriptive.

In a typical process employing petroleum naphtha, straight-run and cracked petroleum naphthas are converted to gasoline of high octane number by passing the vaporized feed over a catalyst, generally a platinum catalyst, at temperatures ranging from about 850° to 1000°F. at pressures of from about 100 to 500 pounds per square inch gauge in the presence of hydrogen at a flow rate of about 500 to 5000 standard cubic feet per barrel of feed. In other typical processes, the conditions will vary somewhat depending on petroleum fraction employed and the extent to which upgrading of the feed-stock is desired.

The invention is more fully illustrated by the examples which follow, wherein all parts and percentages are by weight unless otherwise specifically designated.

In order to compare performance of the various catalysts evaluated, a platinum-promoted catalyst in the form of cylindrical particles of ⅛ inch diameter was arbitrarily assigned an activity both as to weight and volume activity. Activity of a catalyst is calculated from the initial temperature required to produce 100 octane reformate by use of the equation:

$$\log \text{activity} = (1/3.44 - 0.387 \text{RON}) + 20993/T + \log \text{LHSV} - 15.2156$$

wherein T is the initial temperature required to produce 100 octane reformate in degrees Rankin, RON is the Research Octane Number, and LHSV is the liquid hourly space velocity at which the reaction is run. Since all runs were made at 100 octane and constant LHSV, the equation reduces to the following in the present instance:

$$\log A = (20993/T) - 13.0664$$

The volume activity is that obtained from the equation and the weight activity is calculated by taking catalyst density into account.

CATALYST PREPARATION

To demonstrate the advantages of certain cross sectional shapes in formed catalyst, a series of catalysts were prepared all from the same composition of precipitated alumina.

To an agitated tank were charged 1,030 gallons of water. Over a period of about 45 minutes, 3,940 pounds of sodium aluminate solution (28% $Al_2O_3$, about 15% excess $Na_2O$) and 5,430 pounds of aluminum sulfate solution (7.8% $Al_2O_3$) were metered into the water heel. The rates were adjusted so as to hold the pH at about 8.5. When the aluminum sulfate solution was used up, the sodium aluminate solution flow was continued so as to bring the pH of the batch to 10.5. The batch temperature was about 120°F. when the final pH was reached.

The resulting alumina slurry was filtered and washed (using water at pH 9.0) over a rotary vacuum filter to remove the sulfate. Nitric acid was added to the repulped washed cake to reduce the pH to 7.0-7.5. The adjusted slurry was washed over another filter to remove $Na_2O$.

The resulting washed cake was reslurried and spray dried to give a coarse particle.

The spray dried alumina powder (363 pounds) was charged to a muller along with 718 pounds of water. The batch was mixed for about 10-15 minutes and then 75 pounds (ignited basis) of alumina powder were added. The batch was then mulled for an additional 10-15 minutes.

Using a die plate of appropriate orifice shape so as to obtain the desired cross-sectional shaped extrudate, the muller mix was extruded through a conventional auger-type extruder (Welding Engineer Extruder 2010). The extrudates were cut to the dexired length, dried in an oven to about 20 percent weight loss on ignition and then calcined at a temperature of 1,200°F. for 1 hour.

A sample of each shape of catalyst was then impregnated with chloroplatinic acid and dried and calcined as above to provide 0.3 percent platinum and 0.3 percent chloride ion on the final extrudate.

A portion of the platinum impregnated catalysts of certain shapes was then impregnated with perrhenic acid in the presence of hydrochloric acid and dried and calcined as above to provide 0.3 percent platinum, 0.3 percent rhenium, and 0.6 percent chloride ion on the final catalyst. The promoter contents in each instance are by weight based on the total weight of the calcined extrudates.

There are thus provided two series of catalyst materials, one promoted with platinum and one promoted with platinum-rhenium. In each series, the only difference in catalyst particles is in their cross-sectional shape, composition being identical in each series.

In the Examples which follow, specific catalyst shapes are described and activity in hydrotreating is compared using a standard test procedure. Test procedure is as follows:

The feedstock was a mid-continent naphtha cross-sectional following properties;

| | |
|---|---|
| Gravity | 45.5° API |
| Distillation: | |
| Range | 141-396°F. |
| 50% | 251°F |

The catalyst particles were charged into the beds and the reactor was pressure tested. The catalyst was reduced in hydrogen at 350°C. (662°F.) at 1 atmosphere. The naphtha feed was then started under the following conditions:

| | |
|---|---|
| Pressure | 125 psig |
| L.H.S.V. | 2.45 |
| $H_2$ Flow | 3750 Scf/bbl. |
| Catalyst Charge | 55 cc. |

The temperature was raised from 662°F. to the temperature required to produce 100 octane reformate. The refractive index equivalent to 100 octane for the feedstock was 1.4666. This was measured continuously by an Anacon Refractometer.

COMPARATIVE EXAMPLE A

The shape of the catalyst particles in this comparative example was cylindrical, designated as ⅛ inch cylinders. The dimensions were as follows:

| | | |
|---|---|---|
| Diameter | (inch) | 0.125 |
| Length | (inch) | 0.215 |

The catalyst contained 0.3 percent platinum and 0.3 percent chloride ion as promoter. This catalyst was arbitrarily assigned an activity value of 100 both on weight and volume basis and the activity of other catalysts was expressed relative thereto. This catalyst represents a commercial prior art catalyst.

COMPARATIVE EXAMPLE B

The shape of this catalyst was identical to that of Comparative Example A but the promoter content was 0.3 percent platinum, 0.3 percent rhenium, and 0.6 percent chloride ion. This catalyst represents an alternative commercial prior art catalyst.

COMPARATIVE EXAMPLE C

The shape of this catalyst was also cylindrical, designated as 1/16 inch cylinders. The dimensions were as follows:

| Diameter (inch) | 0.052 |
|---|---|
| Length (inch) | 0.216 |

The catalyst contained the same promoter content as in Comparative Example A.

The catalyst is of conventional shape but is not used commercially because pressure drop associated therewith is considered too great. The pressure drop associated with this catalyst is arbitrarily assigned a value of 100 for comparison purposes.

COMPARATIVE EXAMPLE D

The shape of this catalyst was as in Comparative Example C but the promoter content was as in Comparative Example B.

COMPARATIVE EXAMPLE E

Figure 2:
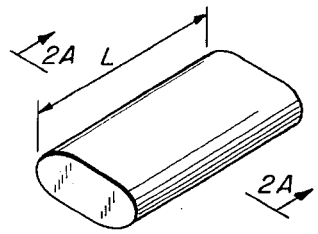
Figures 2, 3, and 7 are cross-sectional views of catalyst particles not of the invention.
Figure 2A:
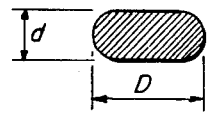

The shape of this catalyst was that of a "plate" as shown in FIG. 2. The dimensions were as follows:

| L | = | 0.186 inch |
|---|---|---|
| D | = | 0.094 inch |
| d | = | 0.056 inch |

The catalyst had the promoter content of Comparative Example A.

COMPARATIVE EXAMPLE F

Figure 3:
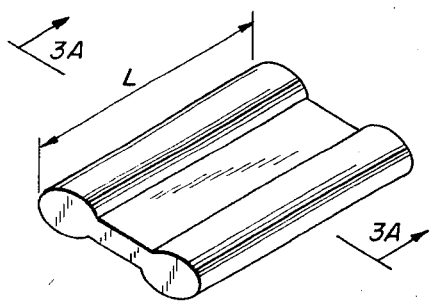
Figure 3A:
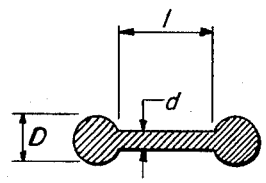

The shape of this catalyst was that a "dumbbell" as shown in FIG. 3. The dimensions were as follows:

| L | = | 0.202 inch |
|---|---|---|
| D | = | 0.0473 inch |
| d | = | 0.0264 inch |
| l | = | 0.0532 inch |

The catalyst had the promoter content of Comparative Example A.

COMPARATIVE EXAMPLE G

Figure 7:
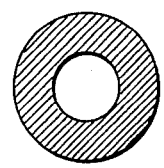

The shape of this catalyst was that of a ring as shown in FIG. 7. The dimensions were as follows:

| Outer diameter | = | 0.135 |
|---|---|---|
| Inner diameter | = | 0.046 |
| Length | = | 0.216 |

The catalyst had the promoter content of Comparative Example A.

EXAMPLE 1

The shape of this catalyst was that of dilobal as shown in FIG. 4 of the drawings. The dimensions were as follows:

| L | = | 0.1814 | inch |
|---|---|---|---|
| D | = | 0.092 | inch |
| d | = | 0.0541 | inch |

The catalyst had the promoter content of Comparative Example A.

EXAMPLE 2

The shape of this catalyst was that of trilobal or "cloverleaf" as shown in FIG. 5 of the drawings. The dimensions were as follows:

| L | = | 0.212 | T | = | 0.442 |
|---|---|---|---|---|---|
| D | = | 0.0919 | | | |
| d | = | 0.0477 | | | |

The catalyst had the promoter content of Comparative Example A.

EXAMPLE 3

The shape of this catalyst was the same as that of Example 2. The catalyst had the promoter content of Comparative Example B.

In Table I which follows, are given the relative volume and weight activities of the various shaped and promoted catalysts in hydroforming as described above.

TABLE I

| CATALYST OF EXAMPLE | CROSS-SECTIONAL SHAPE | RELATIVE ACTIVITY VOLUME | RELATIVE ACTIVITY WEIGHT | PROMOTER |
|---|---|---|---|---|
| Comp. A | ⅛" cylinder | 100(std) | 100(std) | 0.3% Pt.,0.3% Cl— |
| Comp. B | ⅛" cylinder | 57 | 54 | 0.3% Pt. |
| Comp. C | 1/16" cylinder | 102 | 104 | 0.3% Pt,0.3% Cl— |
| Comp. D | 1/16" cylinder | 127 | 121 | 0.3% Pt,0.3% Re,0.6% Cl— |
| Comp. E | Plate | 54 | 49 | 0.3% Pt,0.3% Cl— |
| Comp. F | Dumbbell | 72 | 90 | 0.3% Pt,0.3% Cl— |
| Comp. G | Ring | 52 | 61 | 0.3% Pt,0.3% Cl— |
| 1 | dilobal | 110 | 104 | 0.3% Pt,0.3% Cl— |
| 2 | Cloverleaf | 137 | 132 | 0.3% Pt,0.3% Cl— |
| 3 | Cloverleaf | 159 | 156 | 0.3% Pt,0.3% Re,0.6% Cl— |

The data show the superior activity of catalysts of the present invention compared to that of catalysts of conventional shape or shape other than that of the present invention.

In order to show the advantages in activity more clearly, the relative activities of the cylindrical shaped catalysts are plotted against particle diameter, connecting the points representing ⅛ and 1/16 inch cylinders to establish an expected performance curve, FIG. 1. The points represented by the cloverleaf shaped catalysts of the present invention, which have a large diameter of approximately one-tenth inch are then shown on the plot to show the unexpected improved activity arising from cross-sectional shape. The points represented by the dilobal shaped catalyst are also above the unexpected performance curves, although not as high as those of the cloverleaf. The dilobal shaped catalyst also had a large diameter of approximately one-tenth inch. None of the catalysts of special cross-sectional shape not encompassed by the present invention exhibited activities as good as standard shape and accordingly, would fall below the expected performance curve of FIG. 1.

I claim:

1. In a process of hydroforming a petroleum fraction wherein said petroleum fraction is contacted in gaseous phase with hydrogen and with catalyst particles comprised of an extruded porous alumina base carrying a promoter selected from platinum and mixtures thereof with rhenium, gallium, germanium, iridium, rhodium, and zinc, the improvement which comprises said catalyst particles having a polylobal cross-sectional shape, said polylobal cross-sectional shape being such that the number of lobes is 2 to 5 and said lobes are defined by circles, all of said circles in said cross-sectional shape having equal diameters, the centers of said circles being spaced from one another by a distance which is from about ⅝ to 15/16 of the diameters of said circles and when more than two lobes are present, lines connecting the centers of adjacent circles form a substantially equilateral polygon each side of which is from about ⅝ to 15/16 of the diameters of said circles and all of said cross-sectional shape included by said circles being of said porous alumina.

2. The process of claim 1 wherein said catalyst is promoted with platinum and chloride ions.

3. The process of claim 1 wherein said catalyst is promoted with platinum, rhenium, and chloride ions.

4. The process of claim 1 wherein said catalyst is of dilobal cross-section.

5. The process of claim 1 wherein said catalyst is of trilobal cross-section.

6. The process of claim 2 wherein said catalyst is of trilobal cross-section.

7. The process of claim 3 wherein said catalyst is of trilobal cross-section.

* * * * *

UNITED STATES PATENT OFFICE
CERTIFICATE OF CORRECTION

Patent No. 3,857,780      Dated 31st December, 1974

Inventor(s) WILLIAM ROY GUSTAFSON

It is certified that error appears in the above-identified patent and that said Letters Patent are hereby corrected as shown below:

Column 1, line 53, "if" should read -- is --.

Column 3, paragraphs 2 and 3 are not paragraphs in the specification (page 5).

Column 5, line 32, "activity" should read -- (activity) --.

Column 6, line 13, "dexired" should read -- desired --.

Column 6, lines 36 and 37, end of line 36 and first word of 37 cross sectional have been inserted, the words should be -- with the --.

Column 8, in Table I, under Promoter - 2nd line, "0.3%Pt." should read -- 0.3% Pt, 0.3%Re, 0.6%Cl- --.

Column 9, line 7 - (end of line) "unex" should read -- ex --.

Signed and Sealed this twenty-third Day of December 1975

[SEAL]

Attest:

RUTH C. MASON
*Attesting Officer*

C. MARSHALL DANN
*Commissioner of Patents and Trademarks*